(12) United States Patent
Daily et al.

(10) Patent No.: US 7,044,458 B2
(45) Date of Patent: May 16, 2006

(54) STABILIZER BAR

(75) Inventors: Timothy H. Daily, Grayslake, IL (US); Jiri Pazdirek, Schaumburg, IL (US); Robert G. Budzyn, Elgin, IL (US)

(73) Assignee: MacLean-Fogg Company, Mundelein, IL (US)

( * ) Notice: Subject to any disclaimer, the term of this patent is extended or adjusted under 35 U.S.C. 154(b) by 678 days.

(21) Appl. No.: 09/846,141

(22) Filed: Apr. 30, 2001

(65) Prior Publication Data

US 2002/0180173 A1 Dec. 5, 2002

(51) Int. Cl.
*F16F 1/36* (2006.01)

(52) U.S. Cl. .................... 267/149; 267/154; 267/273
(58) Field of Classification Search ............. 267/154, 267/273, 148, 149
See application file for complete search history.

(56) References Cited

U.S. PATENT DOCUMENTS

| | | | |
|---|---|---|---|
| 3,638,455 A * | 2/1972 | Francois | ............... 64/23 |
| 4,138,141 A | 2/1979 | Andersen | ............ 267/273 |
| 4,372,576 A | 2/1983 | Inoue | |
| 4,380,483 A | 4/1983 | Kliger | |
| 4,431,157 A | 2/1984 | Arild | |
| 4,473,217 A | 9/1984 | Hashimoto | |
| 4,540,197 A | 9/1985 | Finn et al. | |
| 4,693,140 A | 9/1987 | Stephan et al. | |
| 4,718,693 A | 1/1988 | Booher | |
| 4,836,516 A | 6/1989 | Wycech | |
| 4,842,298 A * | 6/1989 | Jarvis | ........... 267/154 |
| 4,908,930 A | 3/1990 | Wycech | |
| 5,120,032 A * | 6/1992 | Smith | ........... 267/273 |
| 5,549,370 A | 8/1996 | Folsom | |
| 5,603,490 A | 2/1997 | Folsom | |

FOREIGN PATENT DOCUMENTS

| | | |
|---|---|---|
| EP | 0 351 723 A2 | 1/1990 |
| EP | 0 391 222 A1 | 10/1990 |
| EP | 0 439 197 A2 | 7/1991 |
| EP | 0 612 931 A1 | 8/1994 |
| GB | 2 178 820 A | 2/1987 |
| JP | 61-21433 A | 1/1986 |
| WO | WO 98/47729 A | 10/1998 |

* cited by examiner

*Primary Examiner*—Pam Rodriguez
(74) *Attorney, Agent, or Firm*—Brinks Hofer Gilson & Lione

(57) ABSTRACT

An automotive suspension stabilizer bar includes a fiber-reinforced composite rod having sets of fibers oriented at 0°, +45°, and −45° with respect to the longitudinal axis of the rod. Each end of the rod is secured to a respective light metal arm by first positioning the rod end in a recess in the arm and then crimping the arm about the rod end. The result is a lightweight, corrosion-resistant stabilizer bar.

14 Claims, 2 Drawing Sheets

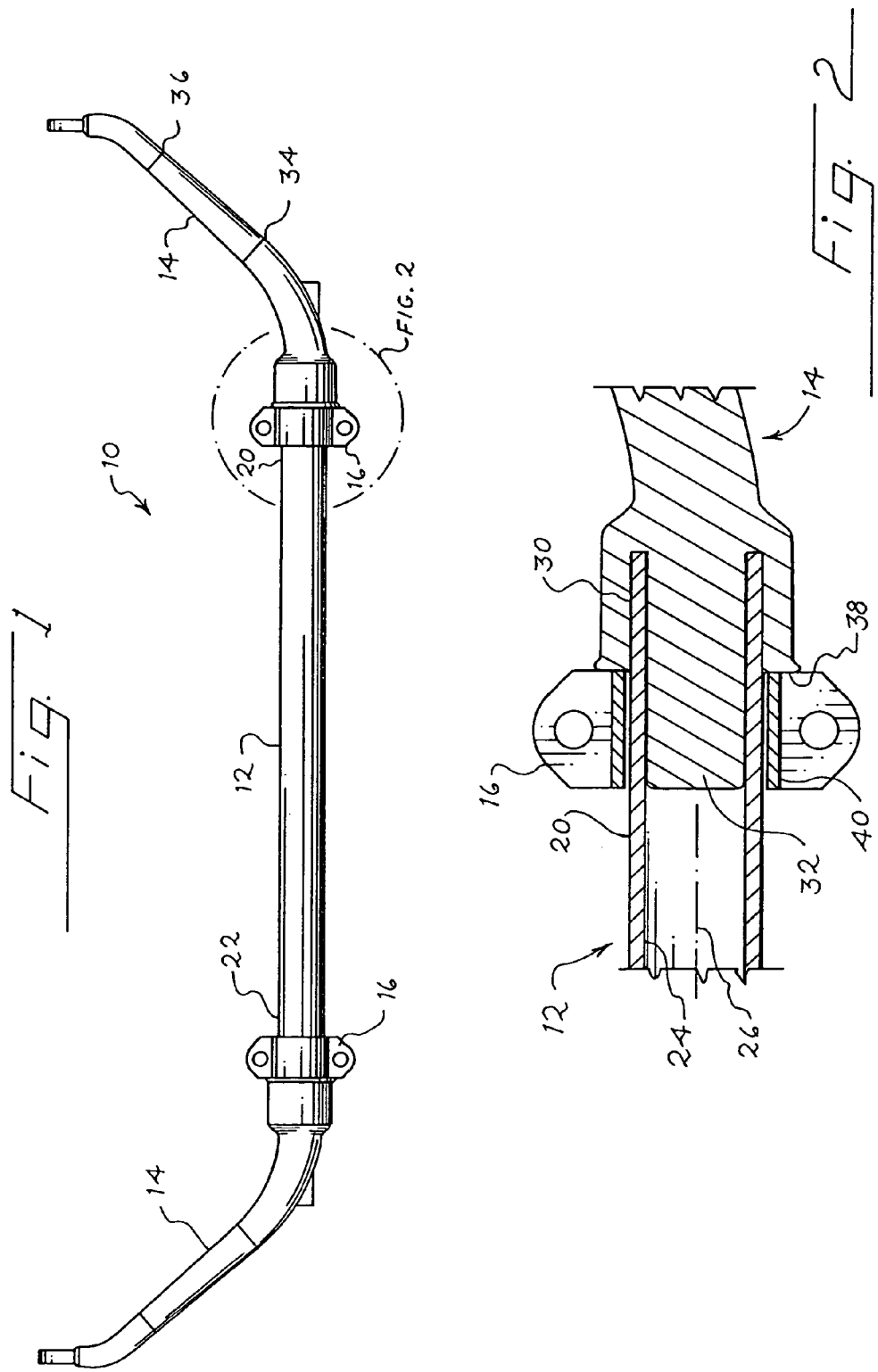

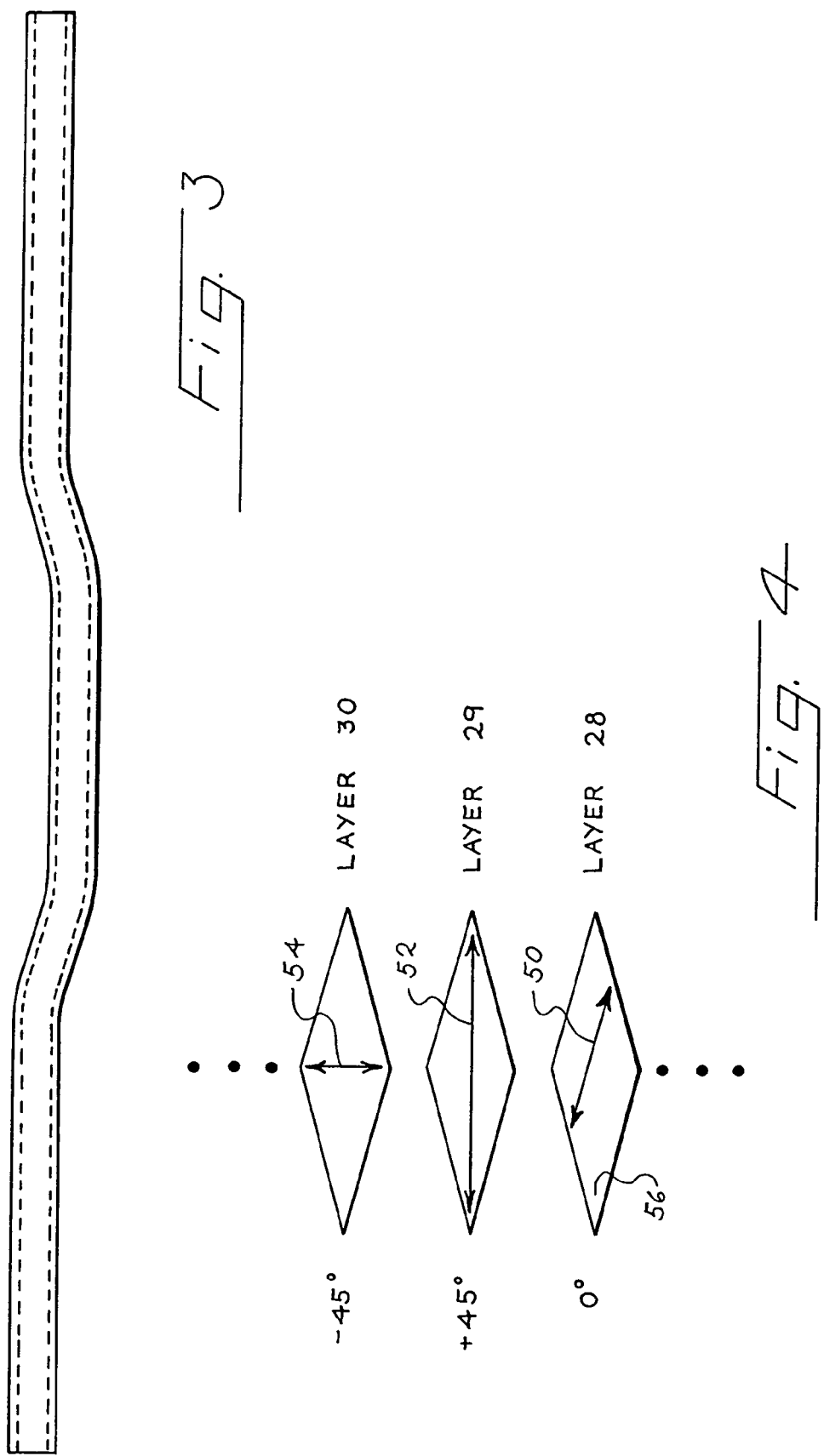

STABILIZER BAR

BACKGROUND OF THE INVENTION

The present invention relates to improved stabilizer bars, such as the stabilizer bars used in automotive suspensions.

Conventional stabilizer bars include a torsion bar that is generally made of steel and attachment points at each end of this bar at which the bar is attached to appropriate suspension components of the vehicle.

Andersen U.S. Pat. No. 4,138,141 describes a tubular suspension bar that is connected at each end to an attachment arm. However, a need presently exists for an improved stabilizer bar that is light in weight and corrosion resistant, and that can be located with a minimum number of parts.

SUMMARY

By way of general introduction, the stabilizer bar described below includes a fiber-reinforced composite rod. Each end of the rod fits into a recess in a respective mounting arm, and the arms are secured to the rod ends at the recesses. Preferably, the arms are made of a light metal alloy, and the composite rod includes a fiber-reinforced resin tube.

This section has been provided by way of general introduction, and it should not be used to narrow the scope of the following claims.

BRIEF DESCRIPTION OF THE DRAWINGS

FIG. 1 is an overall view of a stabilizer bar that incorporates a preferred embodiment of this invention.

FIG. 2 is an enlarged view in partial section of the encircled region of FIG. 1.

FIG. 3 is a plan view of an alternative composite tube suitable for use in the stabilizer bar of this invention.

FIG. 4 is a schematic diagram illustrating three layers of fibers in the composite rod of FIGS. 1 and 2.

DETAILED DESCRIPTION OF THE PRESENTLY PREFERRED EMBODIMENTS

Turning now to the drawings, FIG. 1 shows an overall view of a suspension bar 10 that incorporates a preferred embodiment of this invention. The stabilizer bar 10 includes a composite rod 12 and a pair of arms 14. Each of the arms 14 is secured to a respective end of the composite rod 12 as described below. The stabilizer bar 10 is located in place on a vehicle by a pair of clamps 16. Each of the clamps 16 captures a respective end of the composite rod 12 immediately inboard of a respective one of the arms 14. In use, the ends of the arms 14 remote from the rod 12 are coupled to appropriate suspension components (not shown), and the clamps 16 are secured to the chassis of the vehicle (not shown).

The composite rod 12 includes a first end 20 and a second end 22. As used herein, the term "end" is intended broadly to encompass the extreme end as well as portions of the rod 12 adjacent the extreme end. As shown in FIG. 2, the rod 12 in this embodiment is tubular, and it includes an internal surface 24. In this example, the rod 12 is circularly symmetrical about a longitudinal axis 26. Other geometries are possible, such as a hexagonal cross-section for the inner and/or outer surfaces of the tubular rod.

The arms 14 are identical in this example, and an inner portion of one of the arms 14 is shown in FIG. 2 in cross section. As shown in FIG. 2, each arm 14 includes a recess 30. In this example, the recess 30 is annular and is disposed radially outwardly from a central plug 32. The end 20 of the rod 12 is disposed in the recess 30, surrounding the plug 32. The innermost portion of the arm 14 forms an abutment surface 38 designed to contact the clamp 16 and thereby to locate the stabilizer bar 10 axially with respect to the clamp 16. Note that the rod 12 has a smaller outer diameter than does the inner end of the arm 14. In the example of FIG. 2, the abutting contact between the abutment surface 38 and the clamp 16 prevents the stabilizer bar 10 from moving to the left with respect to the clamp 16. The other clamp 16 similarly restricts motion of the stabilizer bar 10 to the right. As shown in FIG. 2, each clamp 16 includes a bushing 40 that forms a rotary joint with the composite rod 12, allowing rotation of the rod 12 relative to the clamp 16, while the clamps together prevent translational motion of the stabilizer bar 10.

In this example, each arm 14 includes a larger cross-sectional area 34 that is closer to the rod 12 and a smaller cross-sectional area 36 that is farther from the rod 12 (FIG. 1). This tapered arrangement for the arms 14 reduces the weight and cost of the arms 14, without unduly weakening them.

It is not essential in all embodiments that the rod 12 be straight as shown in FIG. 1. Depending upon the application, it may be preferable to provide other configurations for the rod, as shown for example in FIG. 3.

In order to minimize weight and cost of the rod 12, it is preferred to orient the fibers of the rod 12 to carry the torsional and bending loads applied to the rod 12 efficiently. In particular, the rod 12 acts as a torsion bar in both the counterclockwise and the clockwise directions, and it is therefore preferred to include fibers oriented at an angle to the longitudinal axis 26 (FIG. 2). Also, bending forces are applied to the rod 12 in the vicinity of the clamps 16, and it is preferred to have fibers oriented generally parallel to the longitudinal axis 26 to resist these bending loads.

In one example, the rod 12 is formed from many layers of substantially unidirectional fibers. In one example, 32 separate layers are table rolled onto a mandrel. The mandrel is provided with a release agent, such that the mandrel can be removed after the rod is formed. Each of the layers in this example is made up of substantially unidirectional carbon fibers impregnated in a resin binder. For example, each layer can be approximately 0.006 inch thick with the density of about 0.055 lbs/cubic inch. Suitable impregnated fibers can be obtained from Newport Carbon Fibers as product no. NCT 301-1 G 150 (34-700). In this example, the resin binder is formed of a suitable epoxy.

In this example, the 32 separate layers are oriented as set out in Table 1. In Table 1, layer 1 is the radially innermost layer, and layer 32 is the radially outermost layer.

TABLE 1

| Layer No. | Fiber Angle |
| --- | --- |
| 1, 3, 5, 7, 13, 15, 21, 23, 29, 31 | +45° |
| 2, 4, 6, 8, 14, 16, 22, 24, 30, 32 | −45° |
| 9–12, 17–20, 25–28 | 0° |

FIG. 4 provides a schematic representation of three of the layers 28, 29 and 30. Note that the fibers of layer 28 are included in a first set of fibers oriented at 0° with respect to the longitudinal axis. In FIG. 4, these first fibers are indicated schematically at 50 and the resin binder is indicated schematically at 56. In the next layer (layer 29), fibers 52 of the second set are oriented at an angle of +45° with respect to the longitudinal axis, and in the next layer (layer 30) fibers 54 of the third set are oriented at −45° with respect to the longitudinal axis. The properly-oriented fiber layers are cut to the desired width so that they can be rolled about the mandrel (or about a previously-rolled fiber layer) without substantial gaps or overlaps. In the conventional manner, the junctions between the edges of individual fiber layers are offset circumferentially around the mandrel. Once the 32 layers have been wrapped on the mandrel, a layer of cellophane tape is spirally wound over the outermost layer, and then the assembly is baked in an oven to cure the resin.

It is not essential in all embodiments that the fibers be oriented precisely at 0°, +45° and −45°. In each case, a tolerance band about each direction of ±15°, more preferably ±10°, or most preferably ±5° can be used. Also, it is not essential that all of the fibers be oriented as described above. Preferably, more than 50%, more preferably more than 75% and most preferably more than 95% of the fibers are oriented in the preferred directions described above.

Many materials can be used for the composite rod. Preferably, carbon fiber is used as described above, but fiberglass, aramid fiber and other fibers can be used. If desired, an outer layer of aramid fiber can be applied to improve impact resistance. Also, many manufacturing techniques can be used to form the composite rod 12, including the table-roll technique described above, bladder molding processes and filament winding processes.

The arms 14 can be formed of any suitable material. Light metal alloys such as alloys including aluminum, magnesium and titanium are preferred, because they reduce the overall weight of the stabilizer bar. The cross-sectional shape of the arms can be optimized to reduce weight, as by using an oval or an I-beam cross-sectional profile where appropriate. The arms can be shaped in any desired manner, as for example by casting or forging. When the arms are made of an aluminum alloy, the alloy can be anodized to avoid galvanic corrosion between the aluminum and the carbon fiber. Preferably, the arm is shaped to avoid upset profiles, thereby improving the ease of manufacturing.

The arms are held to the rod ends using any suitable approach. The presently preferred approach is to use radial crimping dies to deform or crimp the outermost portion of each arm against the tube 12 and the plug 32. The plug 32 supports the rod end against radial collapse during the crimping operation. Such radial crimping preferably employs multiple crimping points to reduce or eliminate slipping at the joint. The plug 32 can be integrally formed with the arm 14 as shown in FIG. 2, or it can alternatively be fabricated as a separate element. Also, the plug 32 may be provided with circular or non circular (e.g. hexagonal or pentagonal) cross-sectional shapes. Preferably, the cross-sectional shape of the plug 32 matches the central opening of the tube 12. Other approaches such as adhesives and/or pins can be used to secure the arms to the rod. If desired, a sealing material such as silicone or an adhesive can be used to bond and seal the joint between the arm and the rod. This reduces water seepage and thereby improves the joint.

The stabilizer bar described above provides important advantages. It is unusually light in weight and corrosion resistant as compared to a traditional steel stabilizer bar, and the configuration of the arms allows axial movement of the stabilizer bar to be controlled with reference to the vehicle chassis in a particularly simple and low-cost manner.

The foregoing detailed description has described only a few of the many forms that this invention can take. This detailed description is therefore intended by way of illustration. It is only the following claims, including all equivalents, that are intended to define the scope of this invention.

The invention claimed is:

1. A stabilizer bar comprising:
   a fiber-reinforced composite rod comprising a plurality of fibers embedded in a resin binder, said rod comprising first and second rod ends;
   first and second metallic arms secured to the respective rod ends;
   wherein the composite rod comprises a longitudinal axis, wherein the fibers comprise first, second and third sets of fibers, wherein the fibers of the first set are oriented at 0°±15° with respect to the axis, wherein the fibers of the second set are oriented at +45°±15° with respect to the axis, and wherein the fibers of the third set are oriented at −45°±15° with respect to the axis.

2. The stabilizer bar of claim 1 wherein the arms each comprise a light-metal alloy.

3. The stabilizer bar of claim 1 further comprising:
   first and second clamps positioned at least partially around the first and second rod ends, respectively, said first and second clamps positioned to abut the first and second arms, respectively, to limit axial movement of the rod with respect to the clamps.

4. The stabilizer bar of claim 1 wherein the fibers comprise carbon fibers.

5. The stabilizer bar of claim 1 wherein the arms are each tapered from a larger cross-sectional area to a smaller cross-sectional area, said larger cross-sectional area disposed between the rod and the smaller cross-sectional area.

6. The stabilizer bar of claim 1 wherein the rod is tubular in shape.

7. The stabilizer bar of claim 1 wherein the fibers of the first set are oriented 0°±10° with respect to the axis, wherein the fibers of the second set are oriented at +45°±10° with respect to the axis, and wherein the fibers of the third set are oriented at −45°±10° with respect to the axis.

8. The stabilizer bar of claim 1 wherein the fibers of the first set are oriented 0°±5° with respect to the axis, wherein the fibers of the second set are oriented at +45°±5° with respect to the axis, and wherein the fibers of the third set are oriented at −45°±5° with respect to the axis.

9. A stabilizer bar comprising:
   a fiber reinforced composite rod having a tubular configuration and including a plurality of fibers embedded in a resin binder, said rod having first and second open ends;
   said composite rod comprising a longitudinal axis, wherein the fibers comprise first, second and third sets of fibers, wherein the fibers of the first set are oriented at 0°±15° with respect to the axis, wherein the fibers of the second set are oriented at +45°±15° with respect to the axis, and wherein the fibers of the third set are oriented at −45°±15° with respect to the axis;
   first and second arms, each arm comprising a respective recess, each of said recesses receiving one of said rod ends; and
   first and second plugs positioned within the first and second rod ends within the first and second recesses, respectively.

10. The stabilizer bar of claim 9 or 1 wherein the fibers of the first, second, and third sets comprise more than 50% of all of the fibers in the composite rod.

11. The stabilizer bar of claim 9 or 1 wherein the fibers of the first, second, and third sets comprise more than 75% of all of the fibers in the composite rod.

12. The stabilizer bar of claim 9 or 1 wherein the fibers of the first, second, and third sets comprise more than 95% of all of the fibers in the composite rod.

13. The stabilizer bar of claim 9 wherein the fibers of the first set are oriented at 0°±10° with respect to the axis, wherein the fibers of the second set are oriented at +45°±10° with respect to the axis, and wherein the fibers of the third set are oriented at −45°±10° with respect to the axis.

14. The stabilizer bar of claim 9 wherein the fibers of the first set are oriented at 0°±5° with respect to the axis, wherein the fibers of the second set are oriented at +45°±5° with respect to the axis, and wherein the fibers of the third set are oriented at −45°±5° with respect to the axis.

* * * * *